March 10, 1959     G. BAECHLI     2,876,890
SUSPENSION TROUGHING IDLER AND SUPPORTING MEANS THEREFOR
Filed Aug. 29, 1956     2 Sheets-Sheet 1
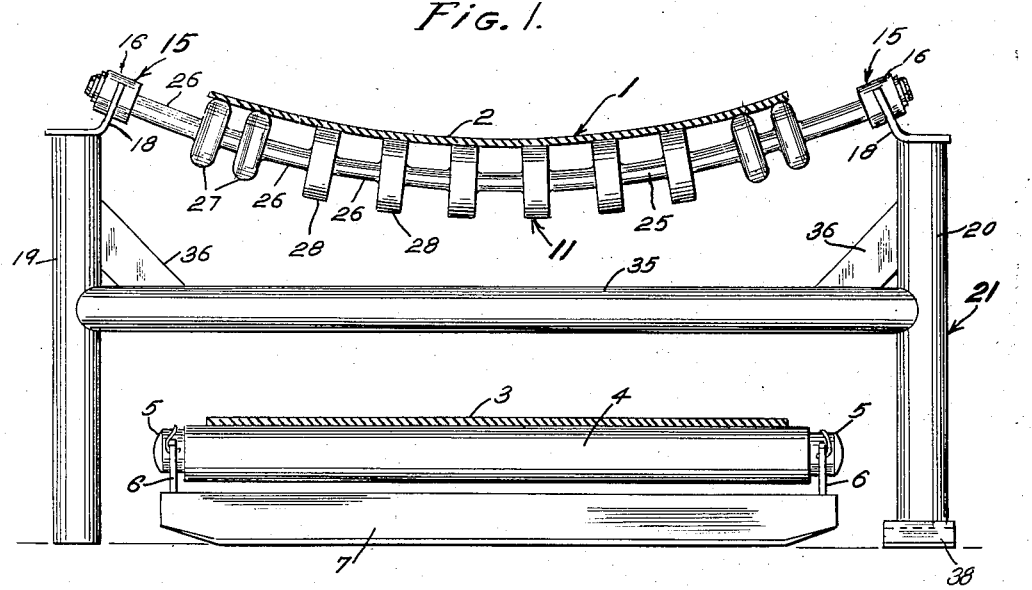
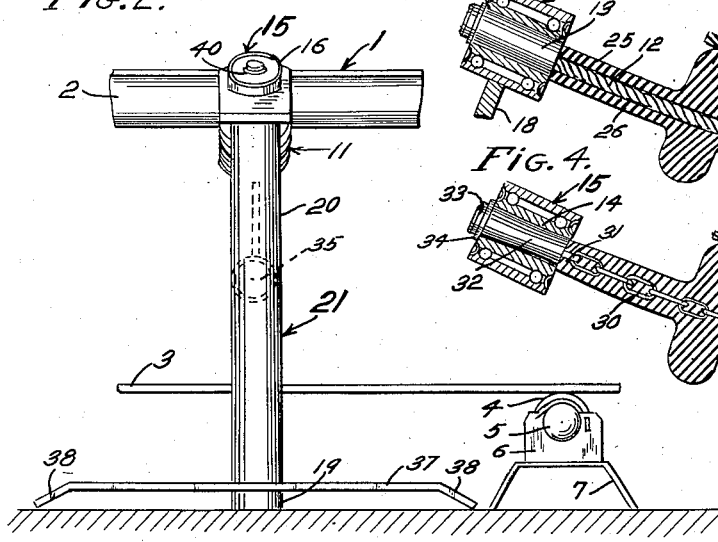
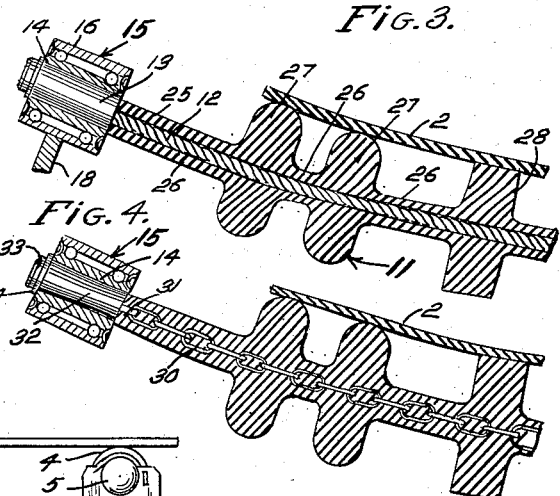
INVENTOR:
GEORGE BAECHLI.
BY Bernard G. Chiama
ATTORNEY.

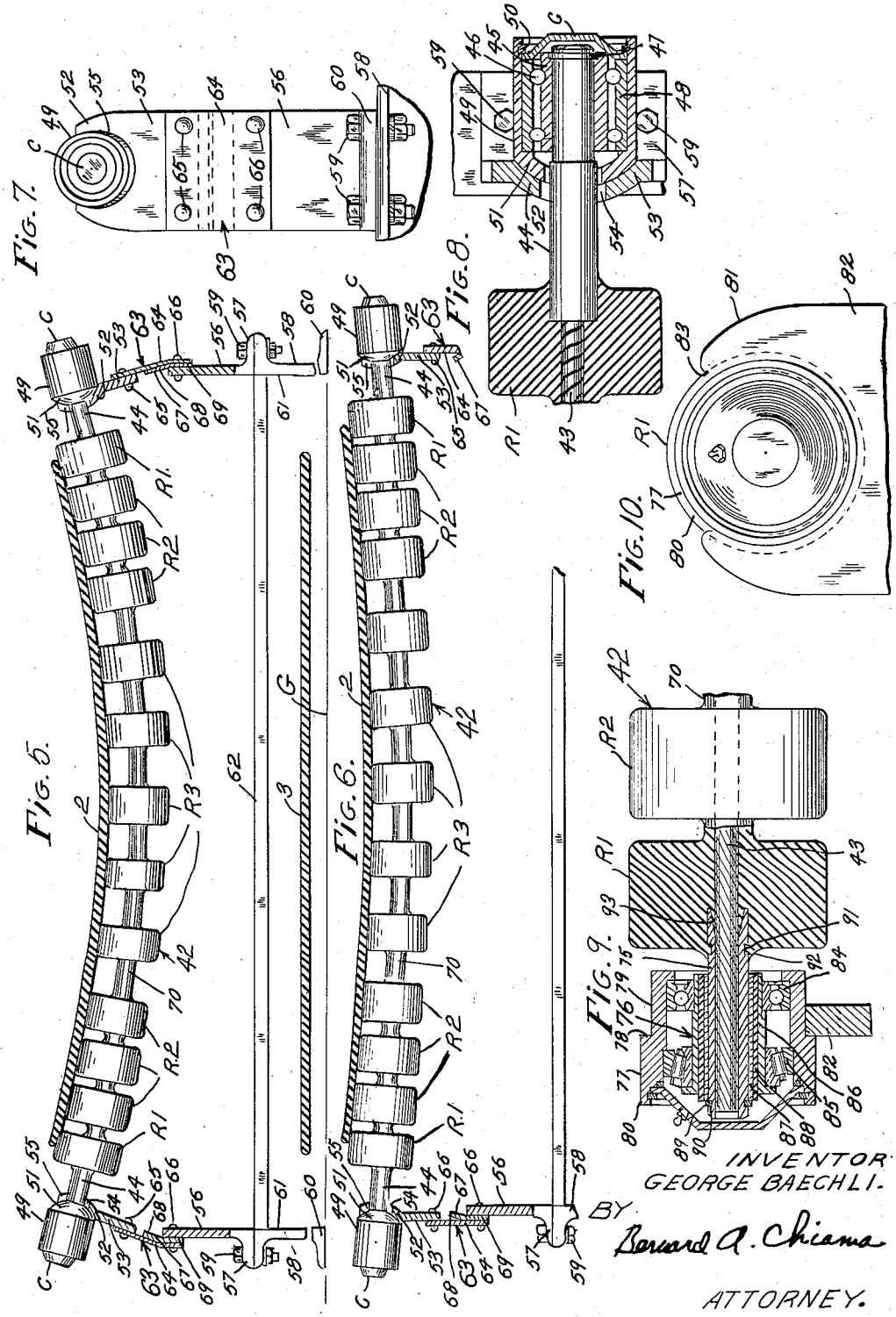

United States Patent Office 2,876,890
Patented Mar. 10, 1959

2,876,890

SUSPENSION TROUGHING IDLER AND SUPPORTING MEANS THEREFOR

George Baechli, New Philadelphia, Ohio, assignor to Joy Manufacturing Company, Pittsburgh, Pa., a corporation of Pennsylvania Application August 29, 1956, Serial No. 606,808

19 Claims. (Cl. 198—192)

This invention relates to troughing idlers for conveyor belts and more particularly to flexible troughing idlers of the suspension type. From another aspect it relates to the supporting arrangements for such idlers.

The present application is a continuation of my application Serial No. 224,185, filed May 2, 1951, now abandoned, as to the entire subject-matter disclosed and claimed in said application, a continuation of my application Serial No. 407,773, filed February 2, 1954, now abandoned, for at least a majority of the subject-matter disclosed and claimed in said second enumerated application, and a continuation of my application Serial No. 531,185, filed August 29, 1955, now matured into Patent No. 2,837,202, for a portion of the subject-matter disclosed and claimed in said third enumerated application.

Flexible troughing idlers of various types have been tried out, but so far as is known these have, prior to the present invention, fallen so far short of satisfactory results that they have not proved commercially satisfactory. For example, troughing idlers employing helical springs and provided at their ends with bearings supported by suitable brackets or the like have been proposed. Other troughing idlers comprising belt supporting rollers rotatably supported by shaft sections pivotally connected together at their mutually adjacent ends have been proposed; and also flexible, open-centered, resilient tubes having bearings at their ends held together by time members extending, with substantial surrounding clearance, through the bores of the tubes and connecting the bearings, but these further constructions have also fallen short of desired results.

A suspension troughing idler should ideally possess as many of the following characteristics as possible:

(1) It should possess the necessary flexibility.

(2) It should have bearings only at its ends, and these desirably of the sealed variety.

(3) It should provide a substantial number of individual rollers, instead of continuously contacting with and supporting the belt throughout the full width of the latter.

(4) The rollers should provide adequate belt support, and desirably those at the opposite ends of the idlers should be so disposed as to facilitate return of the belt to central position when the belt has wandered to one side or the other.

(5) The idler should be strong, and should turn smoothly, with equiangular rotation of its several constituent idler rollers.

(6) It should be abrasion and wear resistant and desirably completely sheathed with resilient, waterproof material, the sheath and rollers preferably being of the same material and formed integrally and bonded to a metallic core.

(7) It should derive its support from a flexible metallic core such as a wire cable embedded in and surrounded by resilient sheath material which is bonded to it.

(8) It should be so formed as to minimize fatiguing of the metal of the cable, and so as to minimize the possibility of there being imposed on the cable or core, particularly at points where the flexible metallic core emerges from inflexible elements or adjoins portions which are prevented from flexing, any permanent bending which might introduce roughness into the rotation of the idler.

(9) It is desirable that the core be well supported against excessive lateral flexing.

(10) From another aspect, the idlers should be readily mounted and dismounted upon suitable supports and be so supported that there is proper accommodation for the reductions and increases in the distance between its ends which is desirably permitted by its mounting, respectively upon increases and decreases of the belt load.

In each of the illustrative embodiments of the invention which will be hereinafter described there will be noted a suspension belt-troughing idler structure having spaced brackets supporting bearings in inwardly tilted positions, a flexible element extending between and rotatably supported by said bearings, and idler rollers molded on and bonded to said flexible element, said flexible element may take the form of a wire cable or a chain. There will also be noted to be present upon the flexible element sheath portions of the same material as, and of one piece with, the idler rollers, these being molded to the flexible element as are the rollers, and covering the flexible element between the rollers. These sheath portions, together with the rollers, will be noted to constitute an integral sheath extending throughout the full length of the flexible portion of the flexible element. The flexible element will be observed to have portions at its ends which are rendered inflexible and which extend into suitable support bearings. The bearings may desirably be of a universally mounted type, as through the use of cooperating spherical surfaces formed on bearing housings and on bearing bracket portions. Though advantageous, such bearing mountings are not imperative, but the bearing mountings employed will provide support for the bearings in mutually inclined relation—in inwardly inclined relation—and permit change in the included angle between the axes of said bearings upon substantial variation in loading of a belt supported by the idlers. The bearings may desirably be supported by brackets between the upper and lower portions of which there are arrangements providing flexibility in planes transverse to the direction in which an idler-supported belt extends, this through the provision of resilient arrangements providing for one range of yield when the belt is empty or only lightly loaded and another range of yield when the belt is relatively heavily loaded. The flexible element (preferably, as noted, a wire cable or a chain) carries a series of rollers fixed to its periphery in spaced relation to each other, and preferably its periphery is completely covered between the rollers by sheath portions of the same material as and integral with the rollers. The material of the sheath and of the roller portions may desirably be of rubber, a rubber compound, or a substitute such as neoprene or the like. The rollers arranged throughout the center portion of the cable may desirably be formed with cylindrical peripheries, and adjacent the ends of the cable the rollers may be either or both specially shaped and more closely positioned to prevent their obstructing the return of a laterally displaced belt to center position. In a preferred arrangement the idlers will be so mounted with respect to the cable, or other flexible element, both at the stiffened end portions of the latter and at the intermediate portions, to provide maximum protection and insure minimum fatiguing of the cable.

An object of the invention is to provide an improved suspension-type troughing idler. Another object is to provide an improved supporting means for a suspension-type troughing idler. A further object is to provide an improved journaling arrangement for a suspension-type troughing idler. A more specific object is to provide an improved suspension-type troughing idler having belt supporting and guiding idlers fixed in a preferred arrangement to a suitably journaled flexible supporting element. Still another object is to provide an improved troughing idler of the type mentioned in which rollers are molded upon and bonded to a flexible supporting element in a preferred arrangement contributing to smoothness of operation, minimization of fatigue of the supporting element and reduction of the possibility of permanent sharp bends in the latter, said flexible supporting element having also molded and bonded thereto sheath portions desirably of the same material as and of one piece with the rollers whereby a sheathing of the flexible supporting element is provided throughout the full length thereof between the stiffened ends above mentioned. Other objects and advantages of the invention will hereinafter appear.

In the accompanying drawings in which for purposes of illustration a preferred embodiment of the invention from its various aspects and certain modifications are shown, Fig. 1 is a transverse sectional view through the upper and lower runs of a belt conveyor showing one illustrative embodiment of my invention.

Fig. 2 is a side elevational view of the structure shown in Fig. 1, and corresponds generally in inclusion to what is shown in Fig. 1.

Fig. 3 is an enlarged fragmentary sectional view on a vertical plane through some of the idler rollers and the bearing means associated with one end of the suspension troughing idler element of Fig. 2.

Fig. 4 is a view corresponding generally to Fig. 3 showing a modified construction.

Fig. 5 is a transverse sectional view through the upper and lower runs of a belt conveyor showing another modified embodiment of the invention.

Fig. 6 is a fragmentary view, similar to Fig. 5, and differs therefrom in that the active run (the only one shown) is illustrated with a degree of troughing encountered in the absence of a load on the belt.

Fig. 7 is a fragmentary side elevational view of the structure shown in the upper part of Fig. 5, and corresponds generally in inclusion to what is shown in that figure.

Fig. 8 is an enlarged fragmentary sectional view on a horizontal plane through an end idler roller and the bearing means associated with one end of the suspension troughing idler element of Fig. 5.

Fig. 9 is an enlarged fragmentary sectional view on a vertical plane through one end of a modified suspension troughing idler element of the type shown in Fig. 5.

Fig. 10 is a fragmentary side elevational view of the structure shown in Fig. 9.

Before proceeding with a detailed description of the various embodiments of the present invention, it may be pointed out that in nearly all of the embodiments a peripherally grooved wire cable is shown as having arranged at its opposite ends sleeve elements having portions adapted for reception in antifriction bearings. In one embodiment of the present invention, and in one modification thereof shown, the sleeve elements include other portions adapted for projection into and embedment in idler rollers and in this embodiment and modification thereof the idler rollers are made of rubberlike material and are bonded both to the cable and to the sleeve elements. The bearings for the sleeve elements are supported by bracket elements of which the upper ends may be rigidly connected with the lower ends, or through spring arrangements comprising main and helper springs, and in this latter arrangement the upper ends of the bracket elements may have the bearings mounted on them for "universal adjustment." Inwardly of the rollers adjacent to the sleeves, there is in a preferred embodiment a plurality of other rollers, closely spaced with respect to each other. The close spacing of these rollers permits limited flexure of a cable but restricts the amount of flexure. Between the groups of closely spaced rollers there is a considerable number of other rollers, more widely spaced apart. Between each roller and the roller next to it the cable is surrounded by a flexible sheath of the same material as the rollers and these sheaths, as well as the rollers, are bonded to the cable so that the cable has a unitary imperforate sheathing from one sleeve to the other. The embedding of the cable immediately adjacent the end of a sleeve prevents any permanent bends in the cable immediately adjacent the end of the sleeve and much reduces the possibility of damage to the cable near the sleeve by excessive fatiguing. In those cases wherein the inward end of the sleeve projects into an end of an idler roller the possibility of permanent bends is further minimized. As there is occasion for little curvature of the cable near its extremities provision of groups of closely spaced rollers near the end rollers does not interfere with the operation of the cable, but reduces danger of damage to the cable by fatiguing and also reduces danger of breakage of the sheath of rubberlike material and the possibility of detriment to the metal of the cable through access of water thereto. Recentering of the belt if it gets off center is also facilitated.

Referring now to Figs. 1-3 of the drawings and noting first Fig. 1, there will be seen a belt conveyor generally designed 1 and including an upper active troughed run 2 and a lower flat return run 3. The return run is guided on cylindrical guide and support rollers 4, having bearings 5, 5 at its opposite ends mounted in upstanding brackets 6 on an inverted metal trough 7 resting on a subjacent surface. As the construction and arrangement of this supporting and guiding device for the return run of the belt is more or less conventional, it will require no further discussion. The upper, active, troughed run 2 of the belt is supported by a suspension idler 11. In a preferred embodiment, as particularly illustrated in Fig. 3, this includes a steel cable 12. A standard ⅜" diameter cable, having 7 strands consisting of 36 wires each without hemp core and constructed wholly of steel, is satisfactory but it will be understood that these details are given for purposes of illustration and are not to be considered as limiting with respect to the invention. To the extreme ends of the cable 12 there are connected, as by peening, sleeve elements 13, and these are so firmly peened to the ends of the cable that they cannot be detached by pulls within the tensile strength of the cable. They are received snugly, and desirably with a press fit, within the inner races 14 of ball bearings 15, and the outer portions of these bearings are oppositely slotted to permit their mounting in forks 18 supported at the upper ends of upright elements 19, 20 of a bracket or stand 21. The construction of this bracket will be more fully explained after the structure of the suspension troughing idler has been more completely stated. The full length of the cable between the sleeves 13 is covered with a resilient, highly wear-resistant material, desirably of neoprene, and neoprene with ASTM 1800 p. s. i. tensile, has been found to be a very satisfactory material. The neoprene covering is generally designated 25 and includes sheath portions 26 extending between roller portions 27, 27 and 28, 28. Most of the roller portions are of the construction of those numbered 28. They are substantially cylindrical and may be on the order of 3" in diameter with 1" face width, but here again it will be understood that the dimensions are subject to change and those given are illustrative. The rollers 27, of which there are shown two outside the endmost rollers 28, near either end of the cable 12, are of the same diameter, or at least substantially so, as the rollers 28, but their peripheries are made curved—as shown, semi-circular—in cross section so that they will not block transverse movement of the belt, if it once gets somewhat laterally displaced, towards central position. The peripheral surface of the completed rollers should be rather firm and 60 durometer hardness (Shore A-durometer) is a satisfactory value.

In molding the sheath and rollers on the cable, a pressure of on the order of 500 p. s. i. may desirably be employed, and the so-called transfer method may advantageously be used, with curing at temperatures from 300–310° F. and a curing time of approximately 35 minutes. The neoprene closely conforms to the grooved outer surface of the cable 12, and with the hardness above mentioned and the interlocking of the grooves in the periphery of the cable with the interfitting neoprene fins formed during the molding process, there is no danger of the sheath or rollers twisting loose from the cable.

The provision of the sheath and rollers molded upon the periphery of the cable protects the cable from abrasion and from rusting. It results in a smoother rolling of the rollers, and in a maintenance of synchronism in the rotation of all of the rollers from end to end of the suspension idler. An extremely smooth action is provided.

So effective is the neoprene or other resilient sheath molded to the flexible supporting element that a cable can be replaced by a link-type chain 30, shown in Fig. 4. Here the rollers and sheath, when molded in place, interlock completely with the links of the chain 30 which they embed in them. The end links of the chain are connected by eyes 31 to plug elements 32, which are mounted in the inner sleeves 14 of the ball bearings 15 shown in Fig. 4. in each case, to permit detachment of a ball bearing from the end of one of the suspension troughing idlers, the sleeve element 13 or the plug element 32, as the case may be, is grooved as at 33 to receive a split holding washer 34.

Returning now to the structure of the stand or bracket 21, it has been noted that it included a pair of uprights 19, 20, each carrying at its top a fork 18. The uprights are connected together by a transverse bar 35 welded at its opposite ends to the uprights, and gusset plates 36 reinforce the connections of the cross bar 35 with the uprights 19, 20.

One of the uprights, 19, is adapted to have its lower end rest directly on a subjacent surface. The other, 20, has connected to it an elongated foot element 37 having downturned feet 38 adapted to engage a subjacent surface, the foot element 37 being desirably welded to upright 20 to which it is connected. It will be appreciated that by laying the stand on its side on the underlying surface, it may readily be passed under a run of belt which it is to support through the troughing idler carried thereby, and then turned into vertical position. The single contact at one side of the belt line and the contact provided by the feet 38, 38 at the other side of the belt line provide a type of three-point support which is very solid. The foot element 37 extends, it will be noted, generally at right angles to the common plane of the uprights 19 and 20 and the transverse bar 35.

There is required little further description of this embodiment of the invention. The troughing idler, on each of the two forms described, will provide a very smooth-running support for a belt. Even without the sheath portions between the rollers a desirable arrangement will be provided in the form of a flexible cable having rollers fixed to it in spaced relation to each other, but the continuous sheath, including the rollers and intermediate tubular portions, all closely adhering to the cable, provides a very smooth-running, durable, well protected suspension idler. It is easily brought into supporting relation to the belt to be supported, and may be mounted on its frame and positioned in supporting relation to the belt by turning the frame on its side and passing the end at which the upright 19 is found through between the runs of the belt, and then bringing the frame to upright position. Any height adjustment can be effected by placing blocks or lumps of material beneath the bottom of the frame. If the belt be crowded to one side its return to center-running position will not be obstructed by the engagement of its edges with the sides of the rollers, the rounded rims of the rollers 27, 27 permitting lateral movement of the belt across them without any material obstruction.

Another form which the invention may take in practice is disclosed in Figs. 5–10. Referring to these figures, and in particular to Fig. 5, it may be observed that the position of the parts illustrated is that corresponding to a fully or substantially fully loaded belt. The conveyor belt 1 may be the same as disclosed in Fig. 1 and includes the upper, active, troughed run 2 and a lower flat return run 3. The return run may be guided in any suitable manner, as by suitably supported and journaled cylindrical guide rollers, not shown because such structures are essentially conventional.

The active troughed run 2 of the belt is supported by a plurality of suspension idler structures or elements generally designated 42. Each idler element 42 includes a steel cables 43 (see Fig. 8) of the same general description as cable 12 in the embodiment of Figs. 1–3. To the extreme ends of the cable there are connected, as by peening, metal sleeve elements 44. These may be of uniform diameter, or have a somewhat larger diameter at one end than at the other—the latter construction being illustrated in Fig. 8. The sleeves are so firmly peened to the ends of the cable that they cannot be detached by pulls within the tensile strength of the cable. Their outer ends, shown in Fig. 8 as slightly reduced in diameter, are closely received in the inner races 45 of ball bearings 46, and snap rings 47 cooperate with the ends of the sleeves 44 to prevent withdrawal of the sleeves from the races, and to hold the bearing 46 and their mountings against escape. The outer races 48 of the bearings 46 are received in cup elements 49 whose outer ends are closed by caps C held in position by snap rings 50. The cup elements 49 have spherically curved end portions 51 which engage concavely spherical portions 52 formed on upper bracket elements 53, there being clearance as at 54 around the sleeve elements to permit angling in all directions of the cup elements 49 relative to the bracket elements 53. The upper bracket elements 53 are slotted as at 55 to permit the cup elements 49 to be positioned in the upper bracket elements. The upper bracket elements 53 are supported by lower bracket elements 56 (see Fig. 5), which have feet 57 by means of which they may be supported upon and secured to a lower frame structure 58 by bolt and nut devices 59. This latter structure has ground-engaging feet 60 and consists of two upright portions 61 and an intermediate spacer portion 62 which may be a plate integrally connected with the upright portions 61, and the portions 61 may desirably be channel irons resting on edge on a subjacent surface G. As the present invention is not concerned with the structure 58, the details of that structure, or of substitutes for it, will not be dealt with at length. Between the elements 53 and 56, there is a spring arrangement 63. This comprises a main spring 64 secured as at 65, as by rivets, to the upper support element 53, and as at 66 to the lower support element 56. Between the springs 64 and the elements 56, there are held by the rivets helper springs 67 which comprise upper and lower portions 68 and 69. Portions 68 project above the tops of the elements 56 and diverge inwardly from a vertical plane whereby, in the position of the parts shown in Fig. 6, the portions 68 do not influence the action of the main springs 64. In the position of the parts shown in Fig. 5, the helper springs 67 provide a yielding resilient backing for the main springs 64, and control and hold within proper limits the movements towards each other of the upper bracket elements 53.

Now reverting to the suspension troughing idler 42, it will be noted that the cable 43 and the sleeve 44 provide support for a plurality of idler rollers. These are designated R1, R2 and R3, R1 being end rollers, R2 series (herein shown as comprising three each) of other rollers closely spaced relative to each other and to the end rollers R1, and R3 being a series of rollers between the most adjacent rollers R2, and being spaced much farther apart from the rollers R2 and from each other than the distances between the rollers R2 and the distances between the rollers R1 and the adjacent rollers R2. Between each roller and the one next to it, the cable is provided with a covering or sheath of rubberlike material. Neoprene is a very suitable material for both the rollers and these sheaths. These sheaths are indicated by 70. The sheaths and the idler rollers are all bonded to the cable and, in addition, the idler rollers R1 are bonded to the sleeves 44, these sleeves extending, as shown in Fig. 8, a substantial distance into the rollers R1, with the result that the rollers R1 are each bonded both to the cable 43 and to one of the sleeves 44. The depth to which the sleeves 44 enter the rollers R1 and the width of these rollers are such that there is possible no material angling of the sleeves with respect to the rollers or of the portion of the cable 43 which lies within the rollers R1 relative to the sleeves 44, and because of the substantial extent to which the sleeves 44 project into the rollers R1 and the sleeves 44, a watertight arrangement is provided, there being no material possibility of the bond loosening to an extent to permit moisture to attain access to the cable. Tight bonding of the rollers R1 to the sleeves 44 may be made more certain by appropriate roughening of the portions of the outer surfaces of the sleeves which extend into the rollers. Further, by reason of this construction, there can be virtually no transverse flexure between the cable 43, where the latter lies within the roller R1, and the sleeves, thus greatly reducing, if not eliminating, fatiguing of the wire of the cable.

As distinguished from the embodiments of Figs. 1–4 all the rollers of the embodiments shown in Figs. 5–10 are shown as cylindrical and with their end surfaces substantially parallel to each other, and the rollers R1 and the most proximate rollers R2 and the several rollers R2 at either end of the cable are arranged so close to each other that relatively little flexure of the cable 43 is possible except in the portion of the cable which lies between the relatively widely spaced sets of rollers R2 near the opposite ends of the cable. If there were much flexure at the ends of the cable, the side surfaces of the rollers R2 would engage each other and the rollers R1 and the adjacent rollers R2 would engage each other, in a manner to limit the flexure of the cable. This arrangement reduces the potential strain on the short portions of the sheath near the ends of the cable, and also reduces the rate of fatiguing of the cable ends because the bending is closely limited.

As will be remembered, there is comparatively little curvature in the end portions of a catenary and, accordingly, the means provided for limiting the amount of flexure of the end portions of the cable does not materially interfere with the belt-guiding functions of the idler element. The closely adjacent rollers R1 and R2 near the ends of the cable guide and support the edges of the belt run 2 in a highly desirable manner.

Another form of the bearing support for the cable and the connection between the bearing sleeve and the end idler roller is shown in Figures 9 and 10. Referring to these figures, it will be observed that the suspension troughing idler element 42 again comprises the wire cable 43, supporting idler rollers including rollers R1 and R2, and sheathed by the idler rollers and by associated sheath portions 70 of small radial thickness, the resultant sheathing extending throughout the full length of the cable at least to sleeve elements 75 peened to the ends of the cable 43. The sleeves 75 are received in appropriate bearing structures later to be described in more detail and generally designated 76. The bearing structures are supported in sleevelike elements 77 provided with annular shoulders 78 each formed between a smaller diameter portion 79 and a larger diameter portion 80. Forked upper end portions 81 of upper bracket elements 82 provide recesses 83 in which the smaller diameter portions 79 of the sleeve like elements 77 are received and against which the shoulders 78 engage. The bracket elements 82 may be suitably resiliently supported by structures similar to the structure 61 shown in Figures 5–8 or the bracket elements 82 may be rigidly secured in inwardly tilted positions to a stand similar to the stand 21 shown in Fig. 1.

Within the sleevelike elements 77 there are provided radial thrust bearings 84 and radial and axial thrust bearings 85, and an external bearing sleeve 86 is mounted in the inner races of these bearings. Between the sleeve 86 and an inner sleeve 87 there is a suitable resilient sleeve 88, as of rubber, which is under such pressure that it prevents slipping of the inner sleeve 87 relative to the outer sleeve 86, and which also provides radial resiliency. The sleeve 75 is held within the inner bearing element 87 by a snap ring 89 received in a groove 90.

By virtue of the construction described it will be appreciated that the resilient sleeve 88 reduces the transmision of longitudinal shocks to the bearings and also reduces the transmission of radial shocks to the bearings and provides for a certain degree of very beneficial resilience in the mountings of the ends of the troughing idlers. Indeed it constitutes in effect a vibration-dampener between the sleeves and the bearings.

With respect to the troughing idler 42, it will be noted that the cable 43 and the sleeve 75 provide support for a plurality of idler rollers. The troughing idler 42 is essentially the same as that shown in Fig. 5 and an extended further description of the same will be unnecessary. It is sufficient to say at this point that the sheaths 70 and the idler rollers R1, R2, R3, etc., are all bonded to the cable and, in addition, the idler rollers R1 are bonded to the sleeves 75, which extend as shown in Fig. 9 a substantial distance into the rollers R1, with the result that the rollers R1 are each bonded both to the cable 43 and to one of the sleeves 75.

It will be noted that the sleeve 75 is provided with an annular groove 91 and the material of the roller R1 is pressed into this annular groove, thus providing two things: (1) an increased security of attachment to the sleeve 75 and reduced possibility of relative axial movement, and (2) an improved sealing between the material of the roller R1 and the sleeve 75 since the bonding action takes place throughout the full extent of the sides and bottom of the groove and is carried, as indicated at 92, a substantial distance along the sleeve beyond the end of the groove. It will be noted, moreover, that the inner end of the sleeve 75 is formed internally with a bell mouth, at 93, the internal diameter being considerably greater at the innermost end of the sleeve than the internal diameter of the sleeve within the bearings, and this bore at the inner end tapers from the larger diameter to the uniform diameter. During the molding of the idlers and sheaths on the cable and on the sleeves the material of which the idlers and sheaths are formed is forced into the bell mouthed inner ends of the sleeves, and, when the molding is completed, there is an additional seal against the entrance of moisture to the cable provided and also a reduction of concentration of stress between the sleeve and the cable, as compared with the construction where the sleeve fits the cable snugly at its own innermost end.

By reason of the arrangements shown (in Fig. 9) and described it will be apparent that an improved suspension troughing idler arrangement is provided in which concentration of stresses in the cable is reduced, the danger of moisture attaining access to the cable and rusting it out is reduced, and improved operation is provided by having the cable surrounding sleeves not only capable of axial yielding due to the presence of the spring mounting if such a mounting be used, but having an associated yielding support through the rubber or rubberlike sleeve 88, and also a reduction in the transmission of shock in radial as well as axial directions. In the absence of this sleeve the bearings, except for the relief provided by the use of spring mountings, would have to take the full shocks due to variations in pull on the ends of the cable and there would be virtually no protection against the transmission of radial shocks to the bearings.

While there are in this application specifically described various forms which the invention may assume in practice, it will be understood that these forms of the same are shown for purposes of illustration, and that the invention may be modified and embodied in various other forms without departing from its spirit or the scope of the appended claims.

What I claim is:

1. A suspension belt-troughing idler structure having spaced supporting bearings in inwardly tilted positions, a flexible element having a striated surface and at its opposite ends sleeves rigidly secured to its periphery for rotationally mounting said flexible element in said bearings, respectively, a flexible cover molded on said flexible element and including idler roller portions and intermediate sheath portions of a diameter smaller than the diameter of said rollers, each of said cover portions being interlockingly secured to said flexible element, and said flexible cover covering said flexible element from sleeve to sleeve.

2. A belt-troughing idler element including, a stranded wire cable having sleeves rigidly secured to the ends thereof for mounting it in bearings and having its periphery covered with a neoprene sheath including portions of small radial thickness and idler roller portions, and all of said portions having interlocking engagement with the grooves in the periphery of said cable.

3. A belt-troughing idler element including; a stranded wire cable having a grooved periphery and having at the ends thereof sleeve elements tightly secured thereto and adapted to support said idler element in bearings, respectively; said wire cable having its periphery covered by a unitary, resilient, rubberlike sheath including spaced idler roller portions and portions of small radial thickness, there being a portion of small radial thickness between each pair of mutually adjacent idler roller portions; said idler roller portions and said portions of small radial thickness completely covering said wire cable for the full length of the latter between said sleeve elements; and all of said portions having interlocking engagement with the grooves in the periphery of said cable and being bonded to the wires of said cable.

4. A suspension belt-troughing idler structure including; spaced elements supporting bearings, respectively, in inwardly tilted positions; metallic sleeves mounted in said bearings, respectively, a flexible, peripherally grooved, wire cable extending at its opposite ends into said metallic sleeves and fixed within the latter; and idler rollers having peripheral faces for engaging a belt and body portions molded directly upon said cable with portions of the inner peripheries thereof of at least as great extent axially of said cable as the width of said faces in direct interlocking engagement with the grooves in the periphery of the cable.

5. A suspension belt-troughing idler structure including, spaced brackets supporting bearings, respectively, spaced more widely than the width of a belt to be supported and guided, a flexible element having idler rollers fixed thereto and extending between and rotatably supported by said bearings, said flexible element being a wire cable and the idler rollers fixed to the flexible element being molded on the cable, said cable having a sheath of the same material as and of one piece with said idler rollers molded to and covering the same between said rollers, and said flexible element having cylindrical sleeves secured to its ends, respectively, and said sleeves having portions extending outwardly into and supported by said bearings, respectively, and each of said sleeves having a spaced portion extending oppositely into the end idler roller nearest the bearing which supports such sleeve.

6. A suspension belt-troughing idler structure having spaced supporting bearings, an elongated flexible belt supporting element having spaced bearing portions mounted in said bearings, said bearings including bearing portions rotating with said element as the latter turns and cooperating portions rotatably supporting said first mentioned bearing portions, means for supporting said cooperating portions including main and helper springs, said helper springs having abutment portions arranged for engagement by said main springs when the belt supported by said belt-troughing idler is loaded to a predetermined degree.

7. A suspension belt-troughing idler structure including spaced brackets supporting bearings, respectively, spaced more widely than the width of a belt to be supported and guided, a flexible element having idler rollers fixed thereto and extending between and rotatably supported by said bearings, said flexible element being a wire cable and the idler rollers fixed to the flexible element being molded on the cable, said cable having a sheath of the same material as and of one piece with said idler rollers molded to and covering the same between said rollers, said flexible element having cylindrical sleeves secured to its ends, respectively, and said sleeves having portions extending outwardly into and supported by said bearings, respectively, each of said sleeves having a spaced portion extending oppositely into the end idler roller nearest the bearing which supports such sleeve, and each of said cooperating spaced portions and end idlers having within the idler a circumferentially extending interlock including a peripheral groove on said spaced portion thereof into which an internal ring of the material of the idler extends and to whose walls it is molded.

8. A suspension belt-troughing idler comprising, a flexible element adapted to be extended between and rotatably supported by bearings and having idler rollers fixed thereto, said flexible element being a wire cable and the idler rollers fixed to the flexible element being molded on the cable, and the cable having a sheath of the same material as and of one piece with said idler rollers molded to and covering the same between said rollers, said flexible element having cylindrical sleeves secured to its ends and adapted to enter bearings, respectively, and each of said sleeves having a portion extending into an end idler roller of said idler rollers and having bonding with said end idler roller at an external and at an internal surface.

9. A suspension belt-troughing idler comprising, a flexible element adapted to be extended between and rotatably supported by bearings and having idler rollers fixed thereto, said flexible element being a wire cable and the idler rollers fixed to the flexible element being molded on the cable, and the cable having a sheath of the same material as and of one piece with said idler rollers molded to and covering the same between said rollers, said flexible element having cylindrical sleeves secured to its ends and adapted to enter bearings, respectively, and each of said sleeves having a portion extending into an end idler roller of said idler rollers and having a grooved periphery and a bell mouthed end opening entered by the material of the end idler roller cooperable therewith.

10. A conveyor belt idler comprising, an elongated flexible member adapted to be supported for rotational movement about its longitudinal axis and having at least spaced portions with a striated outer surface with the striations progressing longitudinally along said flexible member, a plurality of idler members mounted in spaced relation to each other on said flexible member each having outer and inner peripheries, said idler members having said outer peripheries disposed to engage a movable belt for supporting and guiding the same, and each of said inner peripheries having at least a portion initially engaging said spaced portions of the outer surface of said flexible member, respectively, in a plastic state to effect a permanent interlock with said striations on said flexible member whereby said idler members and said flexible member are secured together for rotation as a unit.

11. A conveyor belt idler comprising, an elongated flexible wire cable adapted to be supported for rotational movement about its longitudinal axis, said cable having longitudinally extending grooves on its outer surface, a plurality of idler rollers mounted on said cable to extend outwardly therefrom and in spaced relation to each other, each of said rollers having outer and inner peripheries, each of said rollers having said outer peripheries located to engage a movable belt for supporting and guiding the same, and each of said inner peripheries initially engaging the outer surface of said cable in a plastic state to effect a permanent interlock with the surfaces of said grooves whereby said rollers and said cable are secured together for rotation as a unit.

12. A conveyor belt idler comprising, an elongated flexible wire cable adapted to be supported for rotational movement about its longitudinal axis and having an elongated portion of its periphery enclosed with a resilient sheath, said resilient sheath having alternate portions of small radial thickness and idler roller portions, said idler roller portions extending laterally outward from said cable to be engageable with a movable belt and all of said portions of said sheath having permanent interlocking engagement with the sides of the grooves in the periphery of said cable by being molded thereabout whereby said sheath and said cable are secured together for rotational movement as a unit.

13. A conveyor belt idler comprising, an elongated flexible member adapted to be supported for rotational movement about its longitudinal axis, a plurality of idler members mounted in spaced relation to each other on said flexible member each having outer and inner peripheries, said outer peripheries each being adapted to engage a movable belt for supporting and guiding the same, each of said inner peripheries engaging spaced portions of the outer surface of said flexible member so that said idler members and said flexible member are rigidly secured together for rotation as a unit, and said idler members near the ends of said flexible member being spaced more closely adjacent each other than the idler members intermediate thereof to limit the flexure of the portion of said flexible member to which said end idler members are secured.

14. A conveyor belt idler comprising, an elongated flexible member adapted to be supported for rotational movement about its longitudinal axis, a plurality of idler members mounted in spaced relation to each other on said flexible member each having outer and inner peripheries, said outer peripheries each being adapted to engage a movable belt for supporting and guiding the same, each of said inner peripheries engaging spaced portions of the outer surface of said flexible member so that said idler members and said flexible member are rigidly secured together for rotation as a unit, said spaced relationship comprising a plurality of idler members materially spaced from each other along the central portion of said flexible member and a plurality of idler members closely spaced relative to each other adjacent each end of said cable so that flexure of the end portions of said cable is limited by edge engagement of said closely spaced idler members while the central portions of said flexible member are relatively freely flexible.

15. A suspension belt-troughing idler structure comprising, a flexible element having sleeves rigidly secured to its periphery at its opposite ends, respectively, for rotationally mounting said flexible element, said flexible element having striated outer surfaces at least inwardly adjacent said sleeves, respectively, said sleeves having integral means adjacent their most closely disposed ends, respectively, end idler rollers molded about said flexible member and said sleeves whereby said rollers are interlocked with said striated surfaces and said integral means, respectively, and a plurality of idler members rigidly secured to said flexible member intermediate said end idler rollers.

16. A conveyor belt idler comprising, an elongated flexible member adapted to be supported for rotational movement about its longitudinal axis and having striated portions on its outer surface, idler member means mounted on said flexible member having an outer and inner periphery, said idler member means having said outer periphery disposed laterally outwardly of said flexible member to engage a movable belt for supporting and guiding the same, and said inner periphery having at least a portion initially engaging said striated portions of the outer surface of said flexible member in a plastic state to effect a permanent interlock with said striations on said flexible member whereby said idler member means and said flexible member are secured together for rotation as a unit.

17. A conveyor belt idler comprising, an elongated flexible cable adapted to be supported for rotational movement about its longitudinal axis, said cable having longitudinally extending grooves on its outer surface, an idler member means mounted on said flexible cable having an outer and inner periphery, said idler member means having said outer periphery disposed laterally outwardly of said flexible member to engage a movable belt for supporting and guiding the same, and said inner periphery having at least a portion initially engaging said grooves of said flexible cable in a plastic state to effect a permanent interlock with said grooves on said flexible cable whereby said idler member and said flexible cable are secured together for rotation as a unit.

18. A conveyor belt idler comprising, an elongated flexible link chain adapted to be supported for rotational movement about its longitudinal axis, a plurality of idler members mounted in spaced relation to each other on said chain each having outer and inner peripheries, said idler members having said outer peripheries disposed to engage a movable belt for supporting and guiding the same, and each of said inner peripheries having at least a portion initially engaging spaced portions of said chain in a plastic state to effect a permanent interlock with the openings therein whereby said idler members and said chain are secured together for rotation as a unit.

19. A belt-troughing idler element including an elongated link chain having means rigidly secured to the ends thereof for rotatively mounting it in bearings, and having its periphery covered with a molded resilient sheath including portions of small radial thickness and idler roller portions, all of said portions having interlocking engagement with the opening in the links of said chain.

References Cited in the file of this patent

UNITED STATES PATENTS

| | | |
|---|---|---|
| 1,970,250 | Redler | Aug. 14, 1934 |
| 1,980,437 | Reeves | Nov. 13, 1934 |
| 2,052,900 | Searles et al. | Sept. 1, 1936 |
| 2,061,838 | Johns | Nov. 24, 1936 |
| 2,568,174 | Staacke | Sept. 18, 1951 |

FOREIGN PATENTS

| | | |
|---|---|---|
| 53,825 | Germany | Sept. 15, 1890 |
| 534,044 | Great Britain | Feb. 26, 1941 |